A. BARDIN.
PROCESS FOR THE MANUFACTURE OF REINFORCED GLASS.
APPLICATION FILED JULY 16, 1913.

1,228,165.

Patented May 29, 1917.

WITNESSES

INVENTOR
ABEL BARDIN
BY
ATTORNEYS

UNITED STATES PATENT OFFICE.

ABEL BARDIN, OF PARIS, FRANCE.

PROCESS FOR THE MANUFACTURE OF REINFORCED GLASS.

1,228,165.   Specification of Letters Patent.   Patented May 29, 1917.

Application filed July 16, 1913. Serial No. 779,297.

*To all whom it may concern:*

Be it known that I, ABEL BARDIN, a citizen of the French Republic, and residing at No. 11$^{bis}$ Rue Jean Nicot, Paris, France, apothecary's assistant, have invented certain new and useful Improvements in and Relating to Processes for the Manufacture of Reinforced Glass, of which the following is a complete specification.

This invention has for its object to provide an improved process for the manufacture of reinforced glass, and it consists in covering glass articles for instance window panes, mirrors, plate glass or other articles, whether plain or not with a reinforcing medium in such a manner as to retain the glass splinters in case of breakage without altering the transparency of the glass by the addition of this reinforcing medium.

The improved process consists in projecting, preferably by spraying, pouring or vaporization, on to one of the faces of the glass to be strengthened a transparent, adhesive coating, which when dried is coated with a transparent reinforcing medium, dried and then covered with an impervious, transparent, protective coating, which may be varnish.

In the accompanying drawing.

Figure 1:
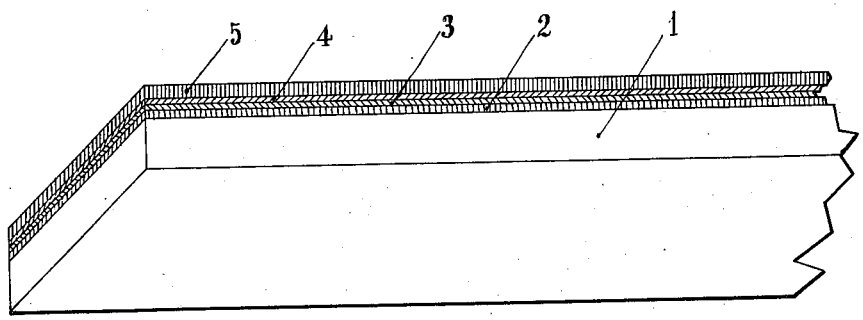
Figure 1 is a perspective view of a portion of a pane of glass having the reinforce applied thereto.
Figure 2:
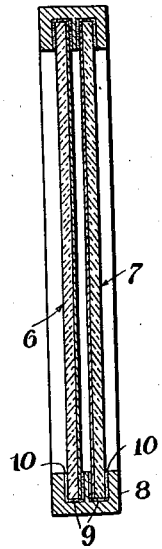
Fig. 2 is a view of a window sash containing a reinforced pane.

The process is carried out in the following manner:

The glass 1 to be reinforced is first washed carefully for example by the aid of iron oxid in suspension in water. Then the glass is dipped into a 20 per cent. solution of chromic oxid in water to destroy all traces of grease. The glass is then rinsed in running water, and then dried.

The glass so cleaned then receives a transparent, adhesive coating, which is preferably a weak solution of gelatin projected on to one of the glass faces in such a manner as to produce thereon an extremely thin film 2 having the thickness of about .03 of a millimeter.

When the gelatin film is dry a transparent reinforcing solution can be poured over the film, but preferably the gelatin film is first coated with a solution intended to improve the adhesion of the reinforcing solution and consists of one or two per cent. of collodion or celluloid or simply nitro-cellulose dissolved in ethyl formate. When this latter coating 3 has solidified it may happen that a haze is produced by said coating. The haze is made to disappear by the application of the following solution, also obtained by vaporization:

| | |
|---|---|
| Celluloid | 2 to 3 grams. |
| Acetone | 30 cubic centimeters. |
| Ether | 30 " " |
| Amyl acetate | 30 " " |
| Amyl alcohol | 10 " " |

The above coating 4 is allowed to dry, and then a celluloid varnishing and protecting coating 5 is poured on. This pouring on may be effected for example by furnishing the edges of the glass with molding strips or with pasteboard strips. To obtain good results, the following solution can be poured on, at the proportion of one liter per square meter of the plate surface:—

| | |
|---|---|
| Celluloid | 5 to 15 grams. |
| Ether | 30 cubic centimeters. |
| Acetone | 30 " " |
| Amyl acetate | 30 " " |
| Amyl alcohol | 20 " " |

The following solution is equally suitable:—

| | |
|---|---|
| Celluloid | 5 to 15 grams. |
| Acetone | 45 cubic centimeters. |
| Amyl acetate | 45 " " |
| Amyl alcohol | 10 " " |

In each of these solutions, the quantity of celluloid given as example, may vary, especially according to the quality of the materials employed. After the plates are perfectly dry, their edges are covered with a suitable impervious varnish to prevent the action of steam, water, or external agents. Bichromated gelatin or other suitable product may also be utilized for this purpose.

The various operations described may be effected by pouring, aided if necessary by using a suitable spreading machine.

For the utilization of the glass plates reinforced according to the process described, two of these plates 6 and 7 are placed in a metal frame 8 or the like. The grooves 9 may be previously formed in the frame to receive the plates, leaving between them a certain play to obviate defects of parallelism of the two plates. Further, an elastic or plastic substance 10 can be inserted in the grooves receiving the plates, which substance is inserted in a liquid or a pasty state into the grooves at the moment of fixing the plate, in such a manner as to effect at the same time the insulation of the protecting coating against external influences. A suitable substance, for example artificial rubber may also be injected into the space between the two plates so joined, in order to more surely prevent the edges of the reinforcement from peeling off under external influences, and to prevent the introduction of dust or bodies of any kind likely to diminish the transparency of the whole.

Between the two plates of the same frame letters or designs of any nature may be arranged to form an advertisement and the whole may form a panel or stained glass window by suitably coloring the gelatin or celluloid coating.

The coloring may be effected by coloring the solutions before using same.

The one of the solutions enumerated above may also be replaced by other suitable solutions in order to obtain for example solutions of gelatin or viscous solutions in the celluloid dissolvents, in carbon disulfid, or in a hydrocarbon. Acetates of cellulose may also be used, for example those soluble in acetic ether with if necessary an addition of acetic acid or of acetates soluble in hydrocarbon.

In certain cases it suffices to soak the gelatined glass plates in a bath of ethyl formate or in covering the gelatin coating with acetic acid.

The invention is applicable to the reinforcement of glass or fragile substances for all purposes for example for mirrors, flat or curved plate glass window panes or other articles.

What I claim is:

1. The herein-described process of making reinforced glass which consists in coating the glass surface with a transparent, adhesive medium, a transparent, reinforcing medium consisting of celluloid, and finally coating the whole with a transparent protecting medium.

2. The herein described process of making reinforced glass which consists in coating the glass surface with layers of transparent, adhesive flexible and protective mediums by pouring the same over the glass successively in the order stated, the flexible medium consisting of celluloid.

3. The herein-described process of making transparent reinforced glass, which consists in applying a gelatin coating thereto, applying a coating of adhesive material consisting of a solution of cellulose ester which in solidifying produces a haze, applying a solution for removing the haze of the adhesive coating, applying a coating of a solution of celluloid, and finally applying a protective coating.

4. The herein-described process of making reinforced glass, which consists in coating the glass with a solution of gelatin, applying a coating of material more adhesive than the gelatin consisting of a solution of a cellulose ester in ethyl formate and which in solidifying produces a haze, applying a haze-removing solution consisting of celluloid, acetone, ether, amyl acetate and amyl alcohol in the proportions set forth, applying a coating of a solution of celluloid, and finally applying a protective coating.

5. The herein-described process of making a transparent reinforced glass, which consists of applying a coating of adhesive material; applying a solution of reinforcing material consisting of celluloid, acetone, amyl acetate and amyl alcohol, and finally applying a protective coating.

6. A reinforced glass consisting of a glass base having superimposed layers of gelatin, celluloid, and varnish.

7. A reinforced glass consisting of a glass base having superimposed coats of binding material, a material more adhesive than the first, a haze-removing material, a reinforcing material, and a moisture-proof protective coating.

8. A reinforced glass consisting of a glass base having superimposed coats thereon and consisting successively of binding material; a more adhesive binding material consisting of a weak solution of a cellulose ester in ethyl formate and productive of a haze in solidifying; a haze removing material consisting of two to three grams of celluloid, thirty cubic centimeters of acetone, thirty cubic centimeters of ether, thirty cubic centimeters of amyl acetate and ten cubic centimeters of alcohol; a reinforcing material, and a moisture-proof protecting material.

9. A reinforced glass consisting of a glass base having superimposed coats thereon and consisting successively of binding material; a reinforcing material consisting of celluloid, ether, acetone, amyl acetate and amyl alcohol; and a protective varnish.

10. The herein described process of making reinforced glass which consists in pouring a transparent, adhesive medium over the glass to form a film thereon, drying it, pouring over it a transparent reinforcing medium consisting of a solution of celluloid, drying the same, and finally pouring over it a transparent, impervious protecting medium and drying the same.

11. The herein described process of making reinforced glass which consists in pouring over the glass surface successively a transparent adhesive medium, a transparent haze removing medium, a transparent reinforcing medium, and finally a transparent protective medium.

In testimony whereof I have hereunto placed my hand at Paris, France, this 3rd day of June 1913.

ABEL BARDIN.

In the presence of two witnesses:
HANSON C. COXE,
LOUIS COQUILLAT.